(12) United States Patent
Brule et al.

(10) Patent No.: US 9,944,794 B2
(45) Date of Patent: Apr. 17, 2018

(54) COMPOSITION MADE FROM POLYAMIDE MXD.10

(71) Applicant: Arkema France, Colombes (FR)

(72) Inventors: Benoit Brule, Beaumont-le-roger (FR); Aude Chiquot, Bernay (FR); Nadine Decraemer, Beaumontel (FR); Yves Deyrail, Evreux (FR); Lionel Jeancolas, Menneval (FR)

(73) Assignee: ARKEMA FRANCE, Colombes (FR)

( * ) Notice: Subject to any disclaimer, the term of this patent is extended or adjusted under 35 U.S.C. 154(b) by 0 days.

(21) Appl. No.: 14/897,556

(22) PCT Filed: Jun. 2, 2014

(86) PCT No.: PCT/FR2014/051293
§ 371 (c)(1),
(2) Date: Dec. 10, 2015

(87) PCT Pub. No.: WO2014/199045
PCT Pub. Date: Dec. 18, 2014

(65) Prior Publication Data
US 2016/0122540 A1 May 5, 2016

(30) Foreign Application Priority Data

Jun. 14, 2013 (FR) ................... 13 55539

(51) Int. Cl.
| | |
|---|---|
| C08L 77/06 | (2006.01) |
| C08J 3/22 | (2006.01) |
| B29C 45/00 | (2006.01) |
| C08J 5/04 | (2006.01) |
| B29K 77/00 | (2006.01) |
| B29K 507/04 | (2006.01) |
| B29L 9/00 | (2006.01) |

(52) U.S. Cl.
CPC .......... *C08L 77/06* (2013.01); *B29C 45/0001* (2013.01); *C08J 3/226* (2013.01); *C08J 5/043* (2013.01); *B29K 2077/00* (2013.01); *B29K 2507/04* (2013.01); *B29L 2009/00* (2013.01); *C08J 2377/06* (2013.01); *C08J 2477/02* (2013.01)

(58) Field of Classification Search
CPC . C08L 77/06; C08J 3/226; C08J 5/043; B29C 45/0001
USPC ................... 523/351; 524/495, 496
See application file for complete search history.

(56) References Cited

U.S. PATENT DOCUMENTS

| | | |
|---|---|---|
| 4,822,846 A | 4/1989 | Nomura |
| 2004/0234445 A1 | 11/2004 | Serp |
| 2010/0155673 A1* | 6/2010 | Noda ........................ C08J 3/201 252/511 |
| 2012/0183711 A1 | 7/2012 | Brule |
| 2013/0072613 A1 | 3/2013 | Miltner |

FOREIGN PATENT DOCUMENTS

| | | |
|---|---|---|
| EP | 0272503 | 6/1988 |
| WO | 03002456 | 1/2003 |
| WO | 2011010039 | 1/2011 |

OTHER PUBLICATIONS

Flahaut, E., et al., "Gram-scale CCVD synthesis of double-walled carbon nanotubes," 2003, pp. 1442-1443, No. 12, Chemical Communications, ISSN 1359-734.
International Search Report for International Application No. PCT/FR2014/051293 dated Sep. 17, 2014.
Written Opinion of the International Searching Authority for International Application No. PCT/FR2014/051293 dated Sep. 17, 2014.

\* cited by examiner

*Primary Examiner* — Edward J Cain
(74) *Attorney, Agent, or Firm* — RatnerPrestia

(57) ABSTRACT

The invention concerns a composition comprising a first polyamide, a second polyamide, different from the first polyamide, and 0.1 to 5% by weight of carbonaceous nanofillers, in which: a) the first polyamide comprises a unit derived from the condensation of meta-xylylene diamine or from a mixture of meta-xylylene diamine and para-xylylene diamine with sebacic acid, said first polyamide having a melting temperature $Tf_1$; and b) the second polyamide has a melting temperature $Tf_2$ higher than or equal to $Tf_1-40°$ C. The invention also relates to a method for producing said composition and the use thereof for producing various items.

25 Claims, 1 Drawing Sheet

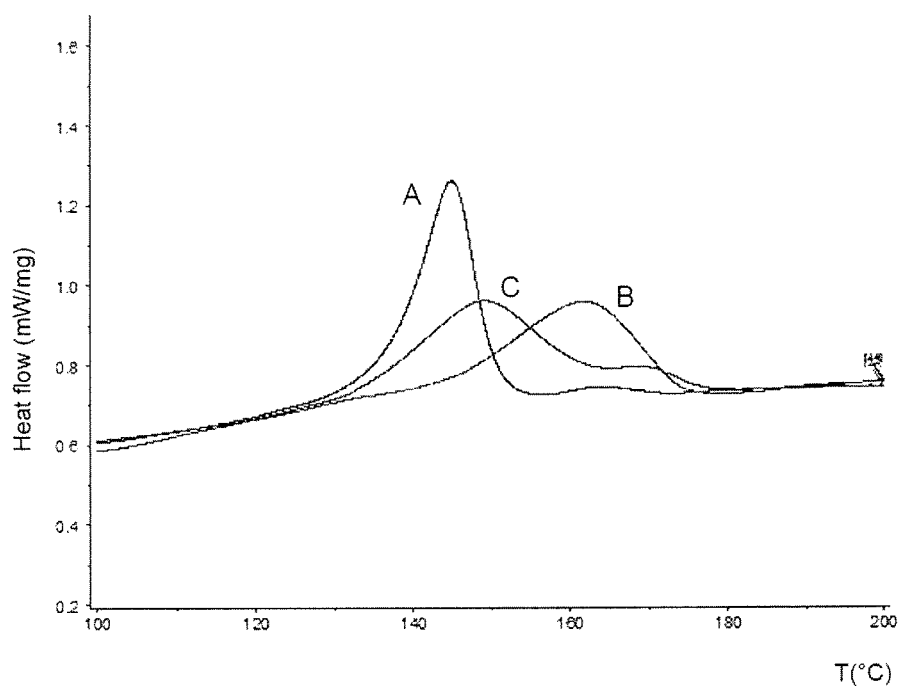

COMPOSITION MADE FROM POLYAMIDE MXD.10

CROSS-REFERENCE TO RELATED APPLICATIONS

This application is the national phase of International Application No. PCT/FR2014/051293, filed Jun. 2, 2014, which claims priority to French Application No. 1355539, filed Jun. 14, 2013. The entire disclosures of each of these applications are incorporated herein by reference for all purposes.

FIELD OF THE INVENTION

The present invention relates to a composition based on polyamides and in particular from polyamide MXD.10, to its process of preparation, to its process of shaping and to its uses, in particular in the manufacture of various objects, such as standard consumer goods, for example electrical, electronic or motor vehicle equipment, medical and surgical equipment, packaging or sports items.

TECHNICAL BACKGROUND

Among the polyamides known to date, some exhibit a major advantage as a result of their noteworthy mechanical properties, in particular due to their high tensile and flexural moduli.

Mention may in particular be made of polyphthalamides (PPAs), which are semiaromatic polyamides which exhibit a high tensile modulus of the order of 3 GPa. This is also the case with polyamide MXD.6, the product of the condensation of MXD and adipic acid, MXD denoting meta-xylylenediamine (optionally mixed with a minor amount of para-xylylenediamine or PXD).

While PPAs and MXD.6 are highly satisfactory in terms of mechanical properties (in particular high tensile modulus), they however exhibit two major disadvantages:
First, in view of their high melting point, PPAs and MXD.6 exhibit a high transformation temperature (typically of greater than 280° C.). In addition to being energy-intensive, the use at a high transformation temperature limits the introduction, into the compositions based on PPAs or MXD.6, of certain reinforcers and/or additives which decompose at such temperatures.
Secondly, as a result of their glass transition temperature (Tg), which is also high, and their slow kinetics of crystallization, the shaping of the materials based on PPAs or on MXD.6 requires operating at relatively high mold temperatures, typically of the order of 120° C. to 130° C. (30 to 40° C. above the Tg), in order to obtain maximum crystallization and thus to confer, on the material, optimum mechanical and dimensional stability properties.

More particularly, during the shaping by injection molding of the materials based on PPAs or MXD.6, it is necessary to use molds using oil as heat-exchange fluid, such molds being more restricting in use and less widespread at molders than molds using water as heat-exchange fluid.

In order to optimize the crystallization of a composition based on MXD.6, the paper entitled *Effect of Nucleating Additives on Crystallization of Poly(m-xylylene adipamide)* and published in the review *Polymer Engineering and Science* in 2007, pp. 365-373, provides for the introduction of nucleating agents, in the case in point talc and PA 6.6, the melting point of which is of the order of 250° C.

The polyamide MXD.10, the product of the condensation of MXD and sebacic acid (decanedioic acid), also exhibits good mechanical properties and in particular a high tensile modulus.

As MXD.10 exhibits a lower melting point (of approximately 193° C.) than that of PPAs or MXD.6, its transformation temperature of between 200° C. and 270° C., and more generally of between 210° C. and 260° C., is lower than that of PPAs and MXD.6, which limits the energy consumption. Furthermore, it is possible to envisage compositions based on MXD.10 comprising certain reinforcers and/or additives which decompose at the transformation temperatures of PPAs and MXD.6.

Furthermore, the density of MXD.10 is lower than that generally observed with regard to PPAs or MXD.6. Thus, the objects obtained from compositions based on MXD.10 exhibit the advantage of being lighter, compared with those obtained from compositions based on PPA or on MXD.6.

On the other hand, as in the case of PPAs or MXD.6, a high mold temperature (typically of the order of 120° C.) is necessary during its shaping by injection molding in order to ensure maximum crystallization of the product and thus to confer optimum mechanical and dimensional stability properties.

In order to improve the molding conditions of a composition based on MXD.10, in particular by lowering the duration of the cooling stage during the shaping by injection molding, the document EP 0 272 503 provides for the addition, to a composition comprising 100 parts by weight of polyamide MXD.10, of from 1 to 20 parts by weight of a crystalline polyamide having a melting point greater by approximately 20 to 30° C. than that of MXD.10.

The crystalline polyamide thus behaves as a nucleating agent, in the absence of any other nucleating agent of the inorganic filler type, such as the talc mentioned above.

In the document EP 0 272 503, the best molding conditions, in particular a rapid cycle, are obtained for a mold temperature of 130° C.

Furthermore, the document WO 2011/010039 describes a composition based on polyamide of MXD.10 type having a melting point $Tf_1$, comprising a second polyamide having a melting point $Tf_2$ of between $Tf_1-40°$ C. and $Tf_1+20°$ C. This second polyamide acts as nucleating agent. It makes it possible to control the crystallization of the composition.

However, there still exists a need to succeed in accelerating the kinetics of crystallization of a composition based on polyamide, and in particular based on MXD.10 or the like, while retaining the mechanical and dimensional stability properties of the crystalline material.

SUMMARY OF THE INVENTION

The invention relates first to a composition comprising a first polyamide, a second polyamide and from 0.1 to 5% by weight of carbon-based nanofillers, in which:
the first polyamide comprises a unit resulting from the condensation of meta-xylylenediamine or of a mixture of meta-xylylenediamine and para-xylylenediamine with sebacic acid, said first polyamide exhibiting a melting point $Tf_1$;
the second polyamide exhibits a melting point $Tf_2$ of greater than or equal to $Tf_1-40°$ C.

According to one embodiment, the carbon-based nanofillers are chosen from carbon nanotubes, carbon nanofibers, carbon black, graphene and the mixtures of these and, preferably, the carbon-based nanofillers are carbon nanotubes.

According to one embodiment, the composition comprises from 0.2 to 2% by weight of carbon-based nanofillers and preferably from 0.5 to 1.5% by weight of carbon-based nanofillers.

According to one embodiment, the second polyamide exhibits a melting point $Tf_2$ such that $Tf_1-40°$ C. $Tf_2 \leq Tf_1+60°$ C., preferably $Tf_1-40°$ C. $\leq Tf_2 < Tf_1+20°$ C., and more particularly preferably $Tf_1-30°$ C. $\leq Tf_2 \leq Tf_1+10°$ C.; or the second polyamide is polyundecanamide.

According to one embodiment, the second polyamide is present in a proportion of 0.1 to 20% by weight, preferably of 1 to 10% by weight, with respect to the sum of the first polyamide and of the second polyamide.

According to one embodiment, the first polyamide is a homopolyamide or a copolyamide, the molar proportion of units resulting from the condensation of meta-xylylenediamine or of a mixture of meta-xylylenediamine and para-xylylenediamine with sebacic acid in said copolyamide preferably being greater than or equal to 90% and more preferably greater than or equal to 95%.

According to one embodiment, the composition additionally comprises reinforcers, advantageously fibers, preferably glass fibers and/or carbon fibers, the proportion by weight of reinforcers in the composition preferably being less than or equal to 70%, advantageously from 15 to 65% and more preferably from 20 to 60%.

According to one embodiment, the composition exhibits a surface resistivity of greater than or equal to $10^{10}$ Ω/sq, preferably of greater than or equal to $10^{12}$ Ω/sq, determined according to the standard ASTM D257.

The invention also relates to the use of carbon-based nanofillers as nucleating agent for the crystallization of a composition comprising a first polyamide and a second polyamide, in which:
the first polyamide comprises a unit resulting from the condensation of meta-xylylenediamine or of a mixture of meta-xylylenediamine and para-xylylenediamine with sebacic acid, said first polyamide exhibiting a melting point $Tf_1$;
the second polyamide exhibits a melting point $Tf_2$ of greater than or equal to $Tf_1-40°$ C.

According to one embodiment, the carbon-based nanofillers are chosen from carbon nanotubes, carbon nanofibers, carbon black, graphene and the mixtures of these and, preferably, the carbon-based nanofillers are carbon nanotubes.

According to one embodiment, the carbon-based nanofillers are used in a content of 0.2 to 2% by weight, preferably of 0.5 to 1.5% by weight, with respect to the total composition.

According to one embodiment, the second polyamide exhibits a melting point $Tf_2$ such that $Tf_1-40°$ C. $\leq Tf_2 < Tf_1+60°$ C., preferably $Tf_1-40°$ C. $\leq Tf_2 < Tf_1+20°$ C., and more particularly preferably $Tf_1-30°$ C. $\leq Tf_2 \leq Tf_1+10°$ C.; or the second polyamide is polyundecanamide.

According to one embodiment, the second polyamide is present in a proportion of 0.1 to 20% by weight, preferably of 1 to 10% by weight, with respect to the sum of the first polyamide and of the second polyamide.

According to one embodiment, the first polyamide is a homopolyamide or a copolyamide, the molar proportion of units resulting from the condensation of meta-xylylenediamine or of a mixture of meta-xylylenediamine and para-xylylenediamine with sebacic acid in said copolyamide preferably being greater than or equal to 90%, more preferably greater than or equal to 95%.

According to one embodiment, the composition additionally comprises reinforcers, advantageously fibers, preferably glass fibers and/or carbon fibers, the proportion by weight of reinforcers in the composition preferably being less than or equal to 70%, advantageously from 15 to 65% and more preferably from 20 to 60%.

According to one embodiment, the carbon-based nanofillers are used in the form of a powder of carbon-based nanofillers or the carbon-based nanofillers are used in a form incorporated in a masterbatch of the second polyamide.

The invention also relates to a process for the preparation of a composition as described above, comprising the provision of a masterbatch comprising the second polyamide and the carbon-based nanofillers and then the melt blending and preferably the compounding of said masterbatch with the first polyamide and, if appropriate, with the reinforcers.

According to one embodiment, the process comprises a preliminary stage of manufacture of the masterbatch by melt blending and preferably by compounding the second polyamide with the carbon-based nanofillers.

According to one embodiment, the process comprises the melt blending and preferably the compounding of the first polyamide with the second copolyamide and with the carbon-based nanofillers and, if appropriate, the reinforcers, simultaneously.

According to one embodiment, the composition is collected in the form of granules.

The invention also relates to the use of the composition described above to form a monolayer structure or at least one layer of a multilayer structure.

According to one embodiment, the structure is in the form of fibers, of film, of pipe, of hollow body or of an injection-molded part.

The invention also relates to a process for the manufacture of an object, comprising a stage of injection molding the composition described above.

The invention also relates to an object manufactured from the composition described above, preferably by injection molding.

According to one embodiment, the object is a mechanical part for transportation and in particular for a motor vehicle, bus, truck, train, ship or aircraft, an item intended for the construction industry, a household item, an electrical item, an electronic item, a medical item or a sports item and in particular a skiing item.

The present invention makes it possible to overcome the disadvantages of the state of the art. It more particularly provides a composition based on polyamide MXD.10 or on copolyamide comprising MXD.10 units which exhibits accelerated kinetics of crystallization with respect to the state of the art and in particular with respect to the document WO 2011/010039, while retaining the mechanical and dimensional stability properties of the crystalline material.

The invention also provides an acceleration in the kinetics of crystallization with respect to the use of conventional nucleating agents, such as talc.

The acceleration in the kinetics of crystallization makes it possible to reduce the injection cycle times and increase the productivity.

This is accomplished by virtue of the use of carbon-based nanofillers as nucleating agent, in addition to a second semicrystalline polyamide exhibiting a melting point close to that of the first polyamide—said second polyamide also acting as nucleating agent jointly with the carbon-based nanofillers.

The composition according to the invention makes it possible to obtain a material or object endowed with excellent mechanical properties, with in particular a tensile modulus of the order of 3 GPa, this composition furthermore simultaneously exhibiting:
- a transformation temperature of the order of the transformation temperature of the polyamide MXD.10, that is to say advantageously between 210° C. and 260° C. (and thus lower than that of PPAs and MXD.6 and compatible with the introduction of reinforcers and/or additives which decompose at the transformation temperatures of PPAs or MXD.6);
- a mold temperature, in particular for shaping by an injection molding process, which is compatible with the use of water as heat-exchange fluid and thus typically less than 100° C. and preferably less than 90° C.

The joint presence of the second polyamide and of the carbon-based nanofillers makes possible effective control of the crystallization of the composition based on polyamide MXD.10.

BRIEF DESCRIPTION OF THE FIGURE

FIG. 1 is a graph illustrating scanning differential calorimetry measurements relating to two compositions according to the invention (B, C) and a reference composition (A)—see the example below. The temperature in ° C. appears on the abscissa and the heat flow in mW/mg appears on the ordinate.

DESCRIPTION OF EMBODIMENTS OF THE INVENTION

The invention is now described in more detail and without implied limitation in the description which follows.
Polyamides The first polyamide of the composition according to the invention is either a homopolyamide, of formula MXD.10, or a copolyamide, corresponding to the generic formula MXD.10/Z, that is to say a copolyamide comprising MXD.10 units and other units Z (it being understood that the copolyamide can comprise just one other (repeat) unit Z, or, in some cases, two or more than two other different units Z).

The unit Z (or each unit Z) can in particular be a unit obtained from an amino acid, a unit obtained from a lactam or a unit corresponding to the condensation of a $C_a$ diamine and of a $C_b$ diacid, a representing the number of carbons of the diamine and b representing the number of carbons of the diacid.

The homopolyamide results from the polycondensation of meta-xylylenediamine (also known as MXD or 1,3-xylylenediamine) or of a mixture of MXD and para-xylylenediamine (also known as PXD or 1,4-xylylenediamine), the MXD being predominant in the mixture, with sebacic acid, which is a linear aliphatic $C_{10}$ diacid.

The copolyamide results from the polycondensation:
- of MXD or of a mixture of MXD and PXD, the MXD being predominant in the mixture,
- of sebacic acid, which is a linear aliphatic $C_{10}$ diacid, and
- of at least one α,ω-aminocarboxylic acid, lactam or $C_a$ diamine and $C_b$ diacid.

The molar proportion of units Z in the MXD.10/Z copolyamide can be, for example, from 0.1 to 10% and advantageously from 0.5 to 5%.

When the unit Z represents the residues of the condensation of an α,ω-aminocarboxylic acid, the latter can, for example, be chosen from 9-aminononanoic acid (Z=9), 10-aminodecanoic acid (Z=10), 12-aminododecanoic acid (Z=12) and 11-aminoundecanoic acid (Z=11) and also its derivatives, in particular N-heptyl-11-aminoundecanoic acid.

When the unit Z represents the residues of the condensation of a lactam, it can in particular be chosen from caprolactam (Z=6) and lauryllactam (Z=12).

When the unit Z represents the residues of the condensation of a $C_a$ diamine and of a $C_b$ diacid, the $C_a$ diamine can be a linear or branched aliphatic diamine, a cycloaliphatic diamine or also an aromatic diamine. The $C_b$ diacid can be a linear or branched aliphatic dicarboxylic acid, a cycloaliphatic diacid or also an aromatic diacid.

It is specified that a represents the number of carbons of the $C_a$ diamine and b represents the number of carbons of the $C_b$ dicarboxylic acid. a and b preferably each have values from 6 to 36.

The composition according to the invention can comprise just one first polyamide or optionally several first polyamides as defined above.

The second polyamide is a polyamide distinct from the first polyamide. It exhibits a melting point $Tf_2$ of greater than or equal to $Tf_1-40°$ C. (and preferably of less than $Tf_1+60°$ C.), $Tf_1$ being the melting point of the first polyamide.

The melting point is determined according to the standard ISO 11357-3.

The second polyamide is a semicrystalline polyamide, in contrast to an amorphous polyamide devoid of melting point.

According to advantageous versions of the invention, the melting point $Tf_2$ is such that $Tf_1-40°$ C.$\leq Tf_2 < Tf_1+20°$ C.; and preferably such that $Tf_1-30°$ C. $Tf_2 \leq Tf_1+10°$ C.

In an advantageous version of the invention, this second polyamide is chosen from PA 11 (polyundecanamide), PA 12 (polylauroamide), PA 10.10 (polydecamethylene sebacamide), PA 10.12 (polydecamethylene dodecanediamide), PA 6 (polycaprolactam), PA 6.10 (polyhexamethylene sebacamide), PA 6.12 (polyhexamethylene dodecanediamide), PA 6.14 (polyhexamethylene tetradecanediamide) and PA 10.14 (polydecamethylene tetradecanediamide). PA 11, PA 12, PA 10.10 and PA 10.12 are preferred as they exhibit a relatively low melting point (less than $Tf_1+20°$ C.), which results in an improved crystallization. PA 11 is particularly preferred.

It is also possible to envisage the use of two or more second polyamides as defined above.

The composition according to the invention comprises said second polyamide in a proportion by weight of 0.1 to 20%, and advantageously of 1 to 10%, with respect to the total weight of the first polyamide and of the second polyamide.

The first polyamide and/or the second polyamide can, in all or part, be biobased, that is to say comprise organic carbon resulting from biomass and determined according to the standard ASTM D6866. Under such an assumption, it may be considered that the composition according to the invention is itself partially biobased, which exhibits an advantage with respect to the compositions based on polyamide(s) resulting from fossil starting materials, such as PPAs and polyamides based on MXD.6.

In particular, the sebacic acid of the unit MXD.10 and/or the unit Z can be biobased. Likewise, the second polyamide can be biobased, as in the specific case where the second polyamide is PA11, a polyamide originating from castor oil.
Carbon-Based Nanofillers Carbon-based nanofillers are used, according to the invention, as nucleating agent for the crystallization of the polyamide composition.

"Carbon-based nanofillers" is understood to mean fillers predominantly composed of carbon and exhibiting at least one dimension (minimal dimension) of less than or equal to 100 nm, preferably of less than or equal to 50 nm and more particularly preferably of less than or equal to 20 nm.

Preferably, the minimal dimension of the carbon-based nanofillers is greater than or equal to 0.4 nm, preferably greater than or equal to 1 nm.

The carbon-based nanofillers can in particular be carbon nanotubes, carbon nanofibers, carbon black, graphene or mixtures of these. Preferably, they are anisotropic nanofillers and thus in particular carbon nanotubes, carbon nanofibers, graphene or mixtures of these. Particularly preferably, they are carbon nanotubes.

Carbon nanotubes are hollow tubular structures comprising a graphite plane positioned around a longitudinal axis or several graphite planes (or sheets) positioned concentrically around a longitudinal axis.

Carbon nanotubes can be of the single-walled, double-walled or multi-walled type. Double-walled nanotubes can in particular be prepared as described by Flahaut et al. in *Chem. Comm.* (2003), p. 1442. Multi-walled nanotubes can be prepared as described in document WO 03/02456.

Carbon nanotubes generally have a mean diameter (perpendicular to the longitudinal axis, the mean value being a linear mean along the longitudinal axis and a statistical mean over an assembly of nanotubes) ranging from 0.4 to 100 nm, preferably from 1 to 50 nm and better still from 2 to 30 nm, indeed even from 10 to 15 nm, and advantageously a length from 0.1 to 10 μm. The length/diameter ratio is preferably greater than 10 and most often greater than 100. These values are meant for carbon nanotubes before introduction into a polymer matrix. This is because, during the incorporation in the polymer matrix, nanotubes have a tendency to be broken and thus to exhibit a reduced length in the final composition (for example a length/diameter ratio of 5 to 10).

The specific surface has a value, for example, of from 100 to 300 $m^2/g$, advantageously from 200 to 300 $m^2/g$, and their bulk density can in particular have a value of from 0.05 to 0.5 $g/cm^3$ and more preferably from 0.1 to 0.2 $g/cm^3$. Multi-walled nanotubes can, for example, comprise from 5 to 15 sheets (or walls) and more preferably from 7 to 10 sheets. These nanotubes may or may not be treated.

The dimensions and in particular the mean diameter of the carbon nanotubes can be determined by transmission electron microscopy.

An example of crude carbon nanotubes is in particular sold by Arkema under the tradename Graphistrength® C100.

These carbon nanotubes can be purified and/or treated (for example oxidized) and/or ground and/or functionalized, before they are employed in the context of the invention.

The grinding of the carbon nanotubes can in particular be carried out under cold conditions or under hot conditions and can be carried out according to the known techniques employed in devices such as ball, hammer, edge runner, knife or gas jet mills or any other grinding system capable of reducing the size of the entangled network of nanotubes. It is preferable for this grinding stage to be carried out according to a gas jet grinding technique and in particular in an air jet mill.

The crude or ground carbon nanotubes can be purified by washing using a sulfuric acid solution, so as to free them from possible residual inorganic and metallic impurities, such as, for example, iron, originating from their preparation process. The weight ratio of the nanotubes to the sulfuric acid can in particular have a value of from 1:2 to 1:3. The purification operation can furthermore be carried out at a temperature ranging from 90° C. to 120° C., for example for a period of time of 5 to 10 hours. This operation can advantageously be followed by stages in which the purified carbon nanotubes are rinsed with water and dried. In an alternative form, the carbon nanotubes can be purified by high-temperature heat treatment, typically at greater than 1000° C.

The oxidation of the carbon nanotubes is advantageously carried out by bringing the latter into contact with a sodium hypochlorite solution including from 0.5% to 15% by weight of NaOCl and preferably from 1% to 10% by weight of NaOCl, for example in a weight ratio of the carbon nanotubes to the sodium hypochlorite ranging from 1:0.1 to 1:1. The oxidation is advantageously carried out at a temperature of less than 60° C. and preferably at ambient temperature, for a period of time ranging from a few minutes to 24 hours. This oxidation operation can advantageously be followed by stages in which the oxidized nanotubes are filtered and/or centrifuged, washed and dried.

The functionalization of the carbon nanotubes can be carried out by grafting reactive units, such as vinyl monomers, to their surface. The constituent material of the carbon nanotubes is used as radical polymerization initiator after having been subjected to a heat treatment at more than 900° C., in an anhydrous medium devoid of oxygen, which is intended to remove the oxygen-comprising groups from its surface. It is thus possible to polymerize methyl methacrylate or hydroxyethyl methacrylate at the surface of carbon nanotubes for the purpose of facilitating in particular their dispersion in the polyamides.

Use is preferably made, in the present invention, of crude carbon nanotubes, that is to say carbon nanotubes which are neither oxidized nor purified nor functionalized and which have not been subjected to any other chemical and/or heat treatment, which are optionally ground.

The term "graphene" is used to denote a flat, isolated and separate graphite sheet but also, by extension, an assemblage comprising between one and a few tens of sheets and exhibiting a flat or more or less wavy structure. This definition thus encompasses FLGs (Few Layer Graphenes), NGPs (Nanosized Graphene Plates), CNSs (Carbon NanoSheets) or GNRs (Graphene NanoRibbons).

Furthermore, it is preferable for the graphene used according to the invention not to be subjected to an additional stage of chemical oxidation or of functionalization.

As indicated above, the graphene used according to the invention is obtained by chemical vapor deposition or CVD. It is characteristically provided in the form of particles having a thickness of less than 50 nm, preferably of less than 15 nm and more preferably of less than 5 nm, and having lateral dimensions of less than a micron, preferably from 10 nm to less than 1000 nm, preferably from 50 to 600 nm and more preferably from 100 to 400 nm. Each of these particles generally includes from 1 to 50 sheets, preferably from 1 to 20 sheets, more preferably from 1 to 10 sheets, indeed even from 1 to 5 sheets, which are capable of being separated from one another in the form of independent sheets, for example during a treatment with ultrasound.

The process for the manufacture of graphene by CVD generally comprises the decomposition of a gaseous carbon source, in particular hydrocarbon, such as ethylene, methane or acetylene, under a stream of inert gas, such as argon or nitrogen, the degree of dilution of the hydrocarbon in the inert gas being, for example, approximately 1:5. This decomposition is carried out at a temperature of 900 to 1000° C., preferably from 960 to 1000° C., generally at atmospheric pressure, over a catalyst in the powder form. The catalyst can in particular be a metal catalyst supported or not supported on an inert substrate. It can, for example, be cobalt optionally mixed with iron and supported on magnesia, in a molar ratio of the cobalt to the magnesia generally of less than 10%. The catalyst is normally prepared by impregnation of the support using solutions of cobalt salts and optionally iron salts in alcohol or glycol, followed by evaporating the solvent and by a calcination stage.

Another CVD process for producing graphene according to this invention comprises the following stages:
  a) introducing into a synthesis reactor, and optionally the placing as a fluidized bed in said reactor, an active catalyst for the synthesis of graphene, comprising a mixed oxide of formula $AFe_2O_4$, where A is at least one metal element having a mixed valency exhibiting at least two valencies, one of which is equal to +2, in particular chosen from cobalt, copper or nickel, the catalyst being of spinel structure,
  b) heating said catalyst in the reactor to a temperature of between 500 and 1500° C., preferably between 500 and 800° C., indeed even between 610 and 800° C.,
  c) bringing a gaseous carbon source into contact with the catalyst of stage b), optionally as a fluidized bed, and catalytically decomposing it at a temperature of 500 to 800° C., preferably of 610 to 800° C., the gaseous source being chosen from $C_1$-$C_{12}$ alcohols and $C_1$-$C_{12}$ hydrocarbons, such as alkanes or alkenes, preferably ethylene, which can be mixed with a stream of a reducing agent, such as hydrogen, and optionally with an inert gas,
  d) recovering the graphene produced in c) at the outlet of the reactor.

Carbon nanofibers are objects of filamentary form. Unlike carbon nanotubes, they are not hollow objects. By way of example, carbon nanofibers can have a herringbone structure (stack of graphene layers oriented symmetrically on either side of a longitudinal axis), or a platelet or lamellar structure (graphene sheets stacked perpendicularly to the axis), or a conical structure, also known as stacked cup structure (continuous graphene sheet wound over itself), or a "bamboo-like" structure (fiber exhibiting periodic variations in diameter, formed of compartments separated by a graphite sheet), or a ribbon structure (graphene sheets oriented parallel to the longitudinal axis without being wound), or a tubular structure (similar to the structure of multi-walled carbon nanotubes).

Carbon nanofibers can have a mean diameter (perpendicular to the the longitudinal axis, the mean value being a linear mean along the longitudinal axis and a statistical mean over an assembly of nanofibers) ranging from 0.4 to 100 nm, preferably from 1 to 50 nm and better still from 2 to 30 nm, indeed even from 10 to 15 nm, and advantageously a length from 0.1 to 10 μm. The length/diameter ratio is preferably greater than 10 and most often greater than 100. These values are meant for carbon nanofibers before introduction into a polymer matrix. This is because, during the incorporation in the polymer matrix, the nanofibers have a tendency to be broken and thus to exhibit a reduced length in the final composition (for example a length/diameter ratio of 5 to 10).

The dimensions and in particular the mean diameter of the carbon nanofibers can be determined by scanning electron microscopy.

The carbon black which can be used in the context of the invention is provided in the form of a powder consisting of particles with a mean diameter of less than or equal to 100 nm, for example from 10 nm to 100 nm. The mean diameter can be determined by statistical observation in transmission electron microscopy.

The content by weight of carbon-based nanofillers in the composition (with respect to the total weight from the composition) can be: from 0.1 to 0.2%; or from 0.2 to 0.3%; or from 0.3 to 0.4%; or from 0.4 to 0.5%; or from 0.5 to 0.6%; or from 0.6 to 0.7%; or from 0.7 to 0.8%; or from 0.8 to 0.9%; or from 0.9 to 1.0%; or from 1.0 to 1.1%; or from 1.1 to 1.2%; or from 1.2 to 1.3%; or from 1.3 to 1.4%; or from 1.4 to 1.5%; or from 1.5 to 1.6%; or from 1.6 to 1.7%; or from 1.7 to 1.8%; or from 1.8 to 1.9%; or from 1.9 to 2.0%; or from 2.0 to 2.1%; or from 2.1 to 2.2%; or from 2.2 to 2.3%; or from 2.3 to 2.4%; or from 2.4 to 2.5%; or from 2.5 to 2.6%; or from 2.6 to 2.7%; or from 2.7 to 2.8%; or from 2.8 to 2.9%; or from 2.9 to 3.0%; or from 3.0 to 3.1%; or from 3.1 to 3.2%; or from 3.2 to 3.3%; or from 3.3 to 3.4%; or from 3.4 to 3.5%; or from 3.5 to 3.6%; or from 3.6 to 3.7%; or from 3.7 to 3.8%; or from 3.8 to 3.9%; or from 3.9 to 4.0%; or from 4.0 to 4.1%; or from 4.1 to 4.2%; or from 4.2 to 4.3%; or from 4.3 to 4.4%; or from 4.4 to 4.5%; or from 4.5 to 4.6%; or from 4.6 to 4.7%; or from 4.7 to 4.8%; or from 4.8 to 4.9%; or from 4.9 to 5.0%.

Other Additives

According to an advantageous version of the invention, the composition can additionally comprise reinforcers.

The addition of reinforcers to the composition of the invention makes it possible to improve some of the mechanical properties, in particular the tensile modulus, of the material obtained from this composition. The natures and the amounts of reinforcers are adjusted to the value desired for the tensile modulus, which can thus achieve values very markedly greater than 3 GPa, for example of the order of 20 GPa in the case of glass fibers.

Reinforcers is understood to mean beads, short or long fibers, woven or nonwoven continuous fibers, a woven or nonwoven mat or also ground materials or flours which make possible an increase in the tensile modulus when they are combined with polymer matrices.

The reinforcers can, for example, be chosen from glass beads, fibers which can be glass or carbon fibers, polymeric fibers, natural fibers (for example plant or animal fibers) and their mixtures.

The carbon fibers can in particular have a diameter of 5 to 15 μm.

Advantageously, the reinforcers can be biobased, that is to say comprise organic carbon resulting from biomass and determined according to the standard ASTM D6866.

The biobased reinforcers capable of being used in the context of the present invention are as follows:
  plant fibers which comprise fibers originating from seminal hairs of seeds (cotton, kapok), bast fibers extracted from plant stems (flax, hemp, jute, ramie, and the like) or hard fibers extracted from leaves (sisal, abaca, and the like), from trunks (Manilla hemp, wood in general) or from fruit husks (coconut, and the like),
  animal fibers which originate from hairs, such as animal fleece, and from secretions, such as silk,
  carbon fibers resulting from biobased starting materials,
  polymeric fibers resulting from biobased starting materials,
  ground materials from bark, peel or pips (hazelnuts, walnuts, and the like), from animal carapaces (crabs, and the like), or from seeds (rice, and the like).

The transformation temperature of the composition according to the invention makes possible a wide choice of reinforcers, for example of certain plant fibers, which exhibits a real economic and technical advantage, in particular because the material or object obtained from a composition comprising such plant fibers exhibits the advantage of being lighter than that obtained from a composition comprising certain other reinforcers, as a result of the reduced density of these plant fibers compared with that of these other reinforcers.

In a specific alternative form of the invention, the reinforcers are advantageously fibers, preferably glass fibers and/or carbon fibers.

Preferably, the proportion by weight of said reinforcers is from 0 to 70%, advantageously from 15 to 65% and preferably from 20 to 60%, with respect to the total weight of the composition according to the invention.

The composition according to the invention can also comprise one or more flame retardants, such as, for example, $Mg(OH)_2$, melamine pyrophosphates, melamine cyanurates, ammonium polyphosphates, metal salts of phosphinic acid or diphosphinic acid or also polymers comprising at least one metal salt of phosphinic acid or diphosphinic acid.

The salt can, for example, be chosen from aluminum methylethylphosphinate and aluminum diethylphosphinate. Mixtures containing such metal salts are sold by Clariant under the trade names Exolit OP1311, OP1312, OP1230 and OP1314.

The transformation temperature of the composition according to the invention makes possible a wide choice of flame retardants, which exhibits a real economic and technical advantage.

Preferably, the proportion by weight of flame retardant has a value of from 0 to 35%, advantageously from 10 to 30% and preferably from 15 to 25%, with respect to the total weight of the composition according to the invention.

The composition can also comprise one or more other additives commonly used in compositions based on polyamides (besides the optional reinforcers and flame retardants described above).

The choice of such additives is broader than for compositions based on PPAs or on MXD.6 as a result of the lowering of the transformation temperature of the composition according to the invention.

Advantageously, the additives can be biobased, that is to say comprise organic carbon resulting from biomass and determined according to the standard ASTM D6866.

The amounts and natures of the additives which can be introduced into the compositions of the invention are adjusted as a function of the effects desired.

Mention may be made, without implied limitation, of at least one additive chosen from fillers, dyes, stabilizers, in particular UV stabilizers, plasticizers, impact modifiers, surface-active agents, pigments, optical brighteners, antioxidants, lubricants, natural waxes and their mixtures.

Mention may be made, among the fillers, of silica, kaolin, magnesia, slag and/or titanium oxide.

It is also possible to envisage including conducting fillers in the composition, such as graphite, for example. Such fillers make it possible to confer electric conducting properties on the composition of the invention and thus on the materials which are obtained from said composition.

However, in a preferred version of the invention, the composition is essentially devoid of electric conducting fillers or completely devoid of electric conducting fillers. In particular, the carbon-based nanofillers present in the composition as nucleating agent are not present in an amount such that they can provide a function of electric conducting fillers. Thus, the composition according to the invention is preferably insulating. In other words, after shaping the composition, the surface resistivity measured is greater than or equal to $10^{10}$ Ω/sq, preferably greater than or equal to $10^{12}$ Ω/sq. Furthermore, it is preferably less than or equal to $10^{18}$ Ω/sq, determined according to the standard ASTM D257.

An advantageous composition within the meaning of the invention can comprise the following proportions by weight of the following different compounds:
  from 10 to 99.9% of the first polyamide and of the second polyamide (preferably PA 11), the proportion by weight of the second polyamide representing from 0.1 to 20% of the combination of the first polyamide and of the second polyamide,
  from 0.1 to 5% of carbon-based nanofillers,
  from 0 to 70% of glass and/or carbon fibers,
  from 0 to 35% of a flame retardant,
  from 0 to 20% and preferably from 0 to 10% of other additives, in order to achieve a total of 100%.

Preparation of the Composition According to the Invention

According to the invention, the composition can be prepared by any method which makes it possible to obtain a homogeneous blend of the polymers, carbon-based nanofillers and optional reinforcers and other additives.

Mention may in particular be made, among these methods, of melt extrusion, compacting or also kneading in a roll mill.

More particularly, the composition according to the invention is prepared by melt blending the polymers with the carbon-based nanofillers and optional additives (including reinforcing fibers) by compounding on a device known to a person skilled in the art, such as a twin-screw extruder, a co-kneader or a mixer. Granules are then obtained. Preferably, the granules are millimetric in size. They can, for example, have a length (maximum dimension) of 2 to 3 mm approximately and a diameter (perpendicular to the length) of approximately 2 mm.

According to a first embodiment, the combined compounds are blended simultaneously, preferably by compounding.

According to a second embodiment, first the second polyamide is blended with the carbon-based nanofillers, in order to prepare a masterbatch. Then, in a second step, this masterbatch is blended with the first polyamide and the optional additives (including reinforcing fibers). Each of the two stages is preferably carried out by compounding.

In an alternative form of this second embodiment, a preprepared masterbatch comprising the second polyamide and carbon-based nanofillers (for example as sold by Arkema, in particular under the reference Graphistrength® C M3-20, PA11 masterbatch) is provided.

It has been found, surprisingly, that the use of such a masterbatch makes it possible to obtain good results in terms of acceleration of the kinetics of crystallization of the composition, which, without wishing to be committed to a theory, suggests that the carbon-based nanofillers are correctly distributed in the first polyamide during the stage of blending the masterbatch with this.

The composition according to the invention, obtained by the preparation process described above, can be transformed for subsequent use or a subsequent transformation known to a person skilled in the art, in particular using devices such as an injection-molding press or an extruder.

The composition according to the invention can also be introduced into a twin-screw extruder feeding, in the absence of an intermediate granulation stage, an injection-molding press or an extruder according to a processing arrangement known to a person skilled in the art.

Use of the composition according to the invention

The composition according to the invention can be used to form a structure.

This structure can be monolayer when it is formed only of the composition according to the invention.

This structure can also be a multilayer structure when it comprises at least two layers and when at least one of the different layers forming the structure is formed of the composition according to the invention.

The structure, whether monolayer or multilayer, can in particular be provided in the form of fibers, of a film, of a pipe, of a hollow body or of an injection-molded part. The invention lends itself particularly well to the production of a part or of an object obtained by an injection-molding process.

It is possible to manufacture an object from at least one composition as defined above, in particular by injection molding, by extrusion, by coextrusion or by multi-injection molding.

The manufacturing process preferably comprises an injection molding stage.

The mechanical properties (in particular tensile modulus) of the material or object obtained from the composition according to the invention are almost wholly independent of the mold temperature chosen, in particular during a stage of shaping by injection molding, by virtue of a good improved crystallization of the composition. The composition according to the invention thus offers the advantage of being able to be shaped by means of any type of mold, whether regulated by water or by oil as heat-exchange fluid. In particular, it is possible to envisage a stage of shaping by injection molding at a mold temperature of less than 100° C. and advantageously of less than 90° C.

Mold temperatures ranging even down to 35° C. can be envisaged. Conversely, it is possible to resort to mold temperatures of greater than 100° C., such as those commonly used with PPAs or MXD.6.

In comparison with compositions based on PPAs or on MXD.6, the composition according to the invention consumes less energy, the transformation temperature and the temperature of the molds advantageously being lower.

The objects prepared from the composition according to the invention can be used in the fields of transportation (in particular mechanical parts for motor vehicles, trucks, trains, buses, ships, aircraft, and the like), the construction industry, the household sector, electricity, electronics, medicine or sport (in particular skiing).

As the composition according to the invention exhibits a lower density than compositions based on PPAs or on MXD.6, an object obtained from such a composition is thus lighter for one and the same volume.

The composition according to the invention can advantageously be used for the production of all or part of the components of electrical and electronic goods, such as encapsulated solenoids, pumps, telephones, computers, printers, fax machines, modems, monitors, remote controls, cameras, circuit breakers, electrical cable jackets, optical fibers, switches or multimedia systems. These components of electrical and electronic goods cover not only the structural parts of such goods (casings, housings, and the like) but also their optional associated accessories (earphones, connecting elements, cables, and the like).

It can also be used for the production of all or part of motor vehicle equipment, such as pipe connectors, pumps, injection-molded parts under an engine hood or injection-molded parts of fender, dashboard or door trim type.

It can also be used for the production of all or part of medical or surgical equipment, of packagings or also of sports or leisure equipment, such as bicycle parts (saddles, pedals and the like), or to form rigid components of footwear, for example.

It can also be used for the production of all or part of components of household equipment (air conditioner, and the like) or household electrical appliances (coffee maker, oven, washing machine, dishwasher, and the like).

EXAMPLE

The following example illustrates the invention without limiting it.

Compositions based on polyamide are prepared from the following compounds:

Homopolyamide PA MXD.10: polymer comprising 57% of biobased carbon and exhibiting a melting point of 193° C., supplier Arkema.

Polyamide PA 11: polymer comprising 100% of biobased carbon and exhibiting a melting point of 185° C., supplier Arkema.

Talc: Stéamic OOS DG, supplier Luzenac.

Glass fibers: reinforcer sold under the reference CT FT 692, supplier Asahi.

Antioxidant: reference Irganox 1010, supplier Ciba.

Calcium stearate: lubricant, supplier BASF.

Carbon nanotubes (CNTs): reference Graphistrength® C100 or C M3-20, supplier Arkema.

The formulations of the compositions (in proportions by weight) and the preparation processes are as follows:

| | Composition A (comparative) | Composition B (invention) | Composition C (invention) |
| --- | --- | --- | --- |
| PA MXD.10 | 44% | 44% | 44% |
| PA 11 | 4.3% | 4.3% | 4.3% |
| Glass fibers | 50% | 50% | 50% |
| Talc | 1% | — | — |
| CNTs | — | 1% | 1% |
| Antioxidant + stearate | 0.7% | 0.7% | 0.7% |
| Manufacturing process | one stage | two stages | one stage |

The one-stage manufacturing process is based on the compounding of all of the compounds in a Leitstriz extruder at 260° C.

The two-stage manufacturing process is based on the compounding of the PA MXD.10, the glass fibers, the antioxidant, the stearate and a masterbatch in a Werner 40 twin-screw extruder at 260° C. The masterbatch comprises the PA 11 and the carbon nanotubes. The masterbatch, available from Arkema under the reference Graphistrength® C M3-20, is prepared by blending PA 11 and Graphistrength® C100 carbon nanotubes on a Buss co-kneader.

The kinetics of crystallization of each of the compositions A, B and C are monitored, under anisothermal conditions, by differential scanning calorimetry, during the cooling following extrusion. The curves obtained are represented in FIG. 1. It should be noted that, under these conditions, an MXD.10 homopolyamide would not crystallize.

The crystallization peak temperatures and crystallization start temperatures are summarized below:

|  | Crystallization peak temperature | Crystallization start temperature |
|---|---|---|
| Composition A | 145° C. | 153° C. |
| Composition B | 165° C. | 177° C. |
| Composition C | 150° C. | 177° C. |

It is thus found that the presence of the carbon nanotubes accelerates the kinetics of crystallization (the crystallization occurring at a higher temperature during the cooling of the composition).

Objects are manufactured by injection molding starting from the compositions A, B and C, with a mold temperature of 115° C. Two types of objects were manufactured: objects with a thickness of 2 mm (standard ISO 527 1 BA) and objects with a thickness of 1 mm (100 mm×100 mm sheet). It is found that the compositions B and C make it possible to reduce the cycle time by 20%, with respect to the reference composition A.

The invention claimed is:

1. A composition comprising a first polyimide, a second polyamide distinct from the first polyamide and from 0.1 to 1.5% by weight of carbon nanotubes, in which:
   the first polyamide comprises a unit resulting from the condensation of meta-xylylenediamine or of a mixture of meta-xylylenediamine and para-xylylenediamine with sebacic acid, said first polyamide exhibiting a melting point $Tf_1$; and
   the second polyamide exhibits a melting point $Tf_2$ of greater than or equal to $Tf_1-40°$ C.

2. The composition as claimed in claim 1, in which second polyamide exhibits a melting point $Tf_2$ such that $Tf_1-40°$ C.$\leq Tf_2 < Tf_1+60°$ C. or in which the second polyamide is polyundecanamide.

3. The composition as claimed in claim 1, in which the second polyamide is present in a proportion of 0.1 to 20% by weight, with respect to the sum of the first polyamide and of the second polyamide.

4. The composition as claimed in claim 1, in which the first polyamide is a homopolyamide or a copolyamide, the molar proportion of units resulting from the condensation of meta-xylylenediamine or of a mixture of meta-xylylenediamine and para-xylylenediamine with sebacic add in said copolyamide being greater than or equal to 90%.

5. The composition as claimed in claim 1, additionally comprising reinforcers, the proportion by weight of reinforcers in the composition being less than or equal to 70%.

6. The composition as claimed in claim 1, wherein the composition exhibits a surface resistivity of greater than or equal to $10^{10}$ Ω/sq, determined according to the standard ASTM D257.

7. A method, comprising using carbon nanotubes as nucleating agent for the crystallization of a composition comprising a first polyamide and a second polyamide distinct from the first polyamide, in which:
   the first polyamide comprises a unit resulting from the condensation of meta-xylylenediamine or of a mixture of meta-xylylenediamine and para-xylylenediamine with sebacic acid, said first polyamide exhibiting a melting point $Tf_1$; and
   the second polyamide exhibits a melting point $Tf_2$ of greater than or equal to $Tf_1-40°$ C., and
wherein the carbon nanotubes are used in an amount of 0.1 to 1.5% by weight based on the total weight of the composition.

8. The method as claimed in claim 7, in which the second polyamide exhibits a melting point $Tf_2$ such that $Th_1-40°$ C.$\leq Tf_2 < Tf_1+60°$ C. or in which the second polyamide is polyundecanamide.

9. The method as claimed in claim 7, in which the second polyamide is present in a proportion of 0.1 to 20% by weight, with respect to the sum of the first polyamide and of the second polyamide.

10. The method as claimed in claim 7, in which the first polyamide is a homopolyamide or a copolyamide, the molar proportion of units resulting from the condensation of meta-xylylenediamine or of a mixture of meta-xylylenediamine and para-xylylenediamine with sebacic acid in said copolyamide being greater than or equal to 90%.

11. The method as claimed in claim 7, in which the composition additionally comprises reinforcers, the proportion by weight of reinforcers in the composition being less than or equal to 70%.

12. The method as claimed in claim 7, in which the carbon nanotubes are used in the form of a powder of carbon nanotubes or in which the carbon nanotubes are used in a form incorporated in a masterbatch of the second polyamide.

13. A process for the preparation of a composition as claimed in claim 1, comprising melt blending a masterbatch comprising the second polyamide and the carbon nanotubes with the first polyamide and, optionally, with reinforcers.

14. The process as claimed in claim 13, comprising a preliminary stage of manufacturing the masterbatch by melt blending the second polyamide with the carbon nanotubes.

15. A process for the preparation of a composition as claimed in claim 1, comprising melt blending the first polyamide with the second copolyamide and with the carbon nanotubes and, optionally, reinforcers, simultaneously.

16. The process as claimed in claim 13, comprising cooling and crystallizing the composition.

17. A method, comprising using a composition as claimed in claim 1 to form a monolayer structure or at least one layer of a multilayer structure.

18. The method as claimed in claim 17, in which the structure is in the form of fibers, of a film, of a pipe, of a hollow body or of an injection-molded part.

19. A process for manufacturing an object, comprising a stage of injection molding the composition as claimed in claim 1.

20. An object manufactured from a composition as claimed in claim 1.

21. The object as claimed in claim 20, which is a mechanical part for transportation, an item intended for the construction industry, a household item, an electrical item, an electronic item, a medical item or a sports item.

22. The composition as claimed in claim 1, wherein the second polyamide is polyamide 11 (PA 11).

23. The composition as claimed in claim 1, which comprises 0.1 to 1.2% by weight of the carbon nanotubes.

24. The composition as claimed in claim 1, wherein the carbon nanotubes have a mean diameter of 0.4 to 100 nm.

25. The composition as claimed in claim 1, wherein the carbon nanotubes are not oxidized or functionalized.

* * * * *

UNITED STATES PATENT AND TRADEMARK OFFICE
CERTIFICATE OF CORRECTION

PATENT NO. : 9,944,794 B2
APPLICATION NO. : 14/897556
DATED : April 17, 2018
INVENTOR(S) : Benoit Brule et al.

Page 1 of 1

It is certified that error appears in the above-identified patent and that said Letters Patent is hereby corrected as shown below:

In the Claims

At Column 15, Line 19 (Claim 1), wherein "polyimide" should read -- "polyamide" --

Signed and Sealed this
Fourth Day of June, 2019

Andrei Iancu
*Director of the United States Patent and Trademark Office*